BEST AVAILABLE COPY
No. 11,877. Reissued Dec. 11, 1900.
N. B. DODGE.
INJECTOR.
(Application filed Oct. 30, 1900.)
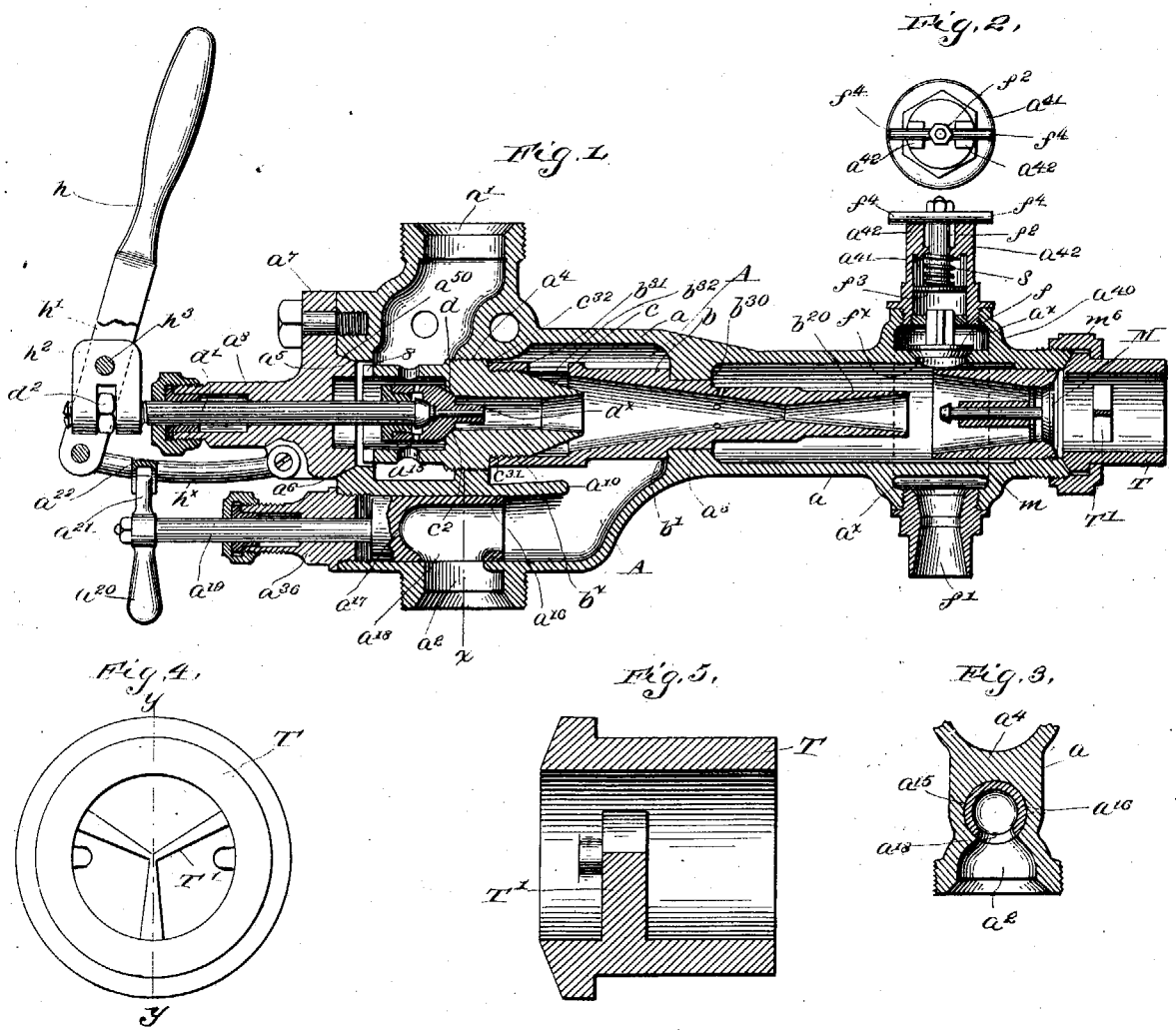
Witnesses:
Thomas J. Drummond.
Edward H. Allen.
Inventor:
Nathaniel B. Dodge.
by Crosby & Gregory.
Atty's.
THE NORRIS PETERS CO., PHOTO-LITHO., WASHINGTON, D. C.

UNITED STATES PATENT OFFICE.

NATHANIEL B. DODGE, OF FITCHBURG, MASSACHUSETTS.

INJECTOR.

SPECIFICATION forming part of Reissued Letters Patent No. 11,877, dated December 11, 1900.

Original No. 660,182, dated October 23, 1900. Application for reissue filed October 30, 1900. Serial No. 34,869.

*To all whom it may concern:*

Be it known that I, NATHANIEL B. DODGE, a citizen of the United States, and a resident of Fitchburg, county of Worcester, State of Massachusetts, have invented an Improvement in Injectors, of which the following description, in connection with the accompanying drawings, is a specification, like characters on the drawings representing like parts.

This invention relates to injectors, more particularly adapted for supplying locomotive-boilers with feed-water, of the general type shown in United States Patent No. 530,476; and one of the objects of my present invention is to provide an injector embodying in its construction various features tending to simplification and reduction of parts and increased efficiency and ease of operation.

Another object is the production of means for preventing disarrangement of the boiler-check in case of breakage or dismemberment of the injector check-valve.

I have so changed and improved the construction that the working parts of the injector can be conveniently detached or assembled without interfering with the boiler connection, and by the compact and convenient construction and arrangement of parts I have rendered the operation and handling much more convenient than has been possible heretofore.

Figure 1 is a longitudinal sectional view of an injector embodying one form of my invention. Fig. 2 is a top or plan view of a portion of the manually-operable controlling means for the overflow check-valve. Fig. 3 is a transverse sectional detail, on the line $x$, Fig. 1, looking toward the left, of the water-supply valve and its chamber or seat. Fig. 4 is an enlarged end elevation of the tailpiece-guard, to be described; and Fig. 5 is a longitudinal section thereof on the line $y\ y$, Fig. 4.

The general arrangement and mode of operation of my injector are substantially such as are well known and understood; but I have herein made the casing $a$ as a single casting, having usual steam and water inlets $a'\ a^2$, respectively, and an annular chamber $a^\times$, communicating with the interior of the casing by a port $f^\times$, controlled by a suitable overflow check-valve $f$, the surplus or overflow water passing out of the chamber $a^\times$ through the outlet-port $f'$. I have herein shown a hollow boss $a^{40}$ at the top of the chamber, threaded to support a chamber $a^{41}$, having its closed end apertured for the snug passage therethrough of the stem $f^2$ of a plunger or piston $f^3$, which is adapted to slide in the chamber, a strong spring $s$ being interposed between the plunger and the end of the chamber. When free to act, the spring forces the plunger down against the stem of the overflow check-valve $f$ and maintains it seated, closing the port $f^\times$, as when it is desired to use the injector as a heater. The outer end of the stem is provided with preferably oppositely-extended lugs $f^4$, adapted, when the plunger is retracted, as shown in Fig. 1, to rest in preferably-notched ears $a^{42}$ on the end of the chamber $a^{41}$, (see Figs. 1 and 2,) the lugs and ears operating as a detent to maintain the plunger in inoperative position, so that the check-valve $f$ will operate automatically.

When the engineer wishes to use the injector as a heater, he grasps the lugs $f^4$ as a handle, lifts them out of the notched ears $a^{42}$, and gives the stem a quarter-turn, releasing the stem, whereupon the spring $s$ forces the plunger $f^3$ down upon the guide-stem of the valve $f$ and maintaining it seated. Reverse operation returns the plunger and stem to the position shown, freeing the check-valve for automatic operation when the injector is in use as such.

I have herein shown the casing as provided with internal, integral, and annular seats $a^3$ $a^4$, the former being smooth or non-threaded, while the latter is screw-threaded, (see Fig. 1,) said seats being in axial alinement, and the bore of the seat $a^3$ is shown as smaller than that of the seat $a^4$. The combining-cone $b$ is exteriorly reduced, as at $b^{30}$, to tightly fit the seat $a^3$ when forced thereinto, the shoulder $b'$ of the cone butting against the transverse face of the seat and positioning the cone longitudinally, and I have herein lengthened the base $b^\times$ of the cone and provided it with an internal thread, as $b^{31}$, to engage a similarly-threaded portion $c^{31}$ of the steam-cone $c$, forming thereby a detachable, though very rigid, connection between the cones. The base $b^\times$ is provided with one or more inlets $b^{32}$, and said base, the part of the combining-cone of largest diameter, can pass freely through the seat $a^4$.

By making the cones with a detachable connection they can be inserted in or removed from the casing as one, greatly facilitating assembling or withdrawal when it is necessary to clean the interior of the injector.

By making a tight sliding fit for the combining-cone in the seat $a^3$ I can more readily assemble the parts, and if using alkali water it is a comparatively easy matter to withdraw the cone when necessary, as the alkaline deposit will not fill up the joint, as in the case of a threaded seat. The cones are introduced from the open steam end of the casing, the steam-cone $c$ having a threaded portion to engage the threaded seat $a^4$, and an annular shoulder $c^{32}$ serves to seat the end of the base $b^{\times}$ of the combining-cone, so that when the shoulder $b'$ thereof engages the seat $a^3$ both cones will be in proper operative position. The cone $c$ has the usual seat $c^2$ for the starting-valve $d$ of substantially usual construction, the tubular extension $d^{\times}$ of the valve and which extends part way into the steam-cone being shown as integral with the valve.

The open steam end of the casing $a$ is shown as having an outwardly-beveled annular edge $a^{50}$, which receives a correspondingly-beveled flange or lip $a^5$ on the inner end of the sleeve or gland $a^7$, which is rigidly, though detachably, secured to the casing in usual manner, the seat $a^{50}$ and flange $a^5$ being preferably ground to a steam-tight joint, closure being completed by the shoulder $a^6$.

Referring to Fig. 1, it will be seen that the outer end of the steam-cone is separated from the inner end of the flange $a^5$, leaving a passage for the steam back of the valve $d$ to retain the latter seated, said cone having notches 8, by which it can be screwed into place by means of a suitable wrench.

The starting valve-stem $d'$ extends through the sleeve or gland $a^8$, by which it is centered and guided, and passes through ears on a block $h^2$, pivoted at $h^3$ on a handle $h$, slotted longitudinally at $h'$ to receive the block and fulcrumed on the radius-bar $h^{\times}$, the latter being in turn pivotally mounted on the sleeve $a^8$. A nut $d^2$ on the threaded end of the valve-stem between the ears of the block $h^2$ operatively and adjustably connects the said valve-stem and block. This very direct and simple actuating device for the injector economizes space, is convenient of access, and is strong and durable, a single movement of the operator's hand in or out effecting the desired result.

The delivery check-valve M is of usual construction and mounted in the delivery end of the casing; but its supporting-shell $m$ I have made long and internally flaring toward the steam end of the injector, so that the mouth of said shell is substantially opposite the overflow check-valve $f$, while the nozzle $b^{30}$ of the combining-cone is elongated to approach within a short distance of the mouth of the shell, the mouth being of considerably larger area than the nozzle of said cone. By this construction I greatly improve the operation of the injector by increasing the rapidity and effectiveness of its action.

By means of a suitable coupling $m^5$ I connect to the delivery end of the casing a tailpiece T, shown as a hollow sleeve provided internally with a guard made as a spider or grid T', preferably an integral part of the sleeve. This tailpiece, inserted as it is between the injector check-valve and the usual boiler-check, operates as a guard to prevent the injector-check or any part of the latter from passing through the feed-pipe to the boiler and preventing the proper operation of the boiler-check.

Serious damage and delay have frequently been caused by the injector-check or some part thereof working through the feed-pipe and preventing the closing of the boiler-check, with the result that the boiler is inevitably emptied of its contents. By the interposition of a guard, as herein shown, it is impossible for any loose part to pass from the injector into the feed-pipe, and thereby any derangement of the operation of the boiler-check is absolutely prevented.

The casing is herein shown as provided with a deflector $a^{10}$, extended forward from the seat $a^4$ and into the lower part of the chamber A, in which the base of the combining-cone is located, the deflector extending above and beyond the water-inlet to deflect the water toward the forward end of the chamber A, so that the water is prevented from passing directly into the combining-cone. The said chamber is of course highly heated, and the circulation given to the entering water tends to raise its temperature before it can enter the combining-cone.

At the lower rear end of the heating-chamber A the casing is shaped to form an elongated cylindrical chamber or seat $a^{15}$, Figs. 1 and 3, its inner end opening into the heating-chamber and its outer end adapted to be closed by a gland or sleeve $a^{36}$, the water-inlet port $a^2$ intersecting the wall of said chamber $a^{15}$. Within this chamber I have shown a rotatable cylindrical valve $a^{16}$, elongated and made tubular, closed at its rear end $a^{17}$, and having a lateral opening $a^{18}$ in its side wall, the stem $a^{19}$ being extended through the gland $a^{36}$, a handle $a^{20}$, secured to the outer end of the stem, being shown in Fig. 1 as provided with a finger $a^{21}$ to enter a longitudinally-grooved transverse arc $a^{22}$, secured to the radius-bar $h^{\times}$. The lateral opening $a^{18}$ is adapted to be brought into register with the inlet $a^2$, whereupon the water will pass through the valve and out of its open inner end into the chamber A, and by turning the valve the inlet $a^2$ can be partly or wholly covered by the solid wall of the valve. By the construction herein shown the valve has a large bearing-surface which thoroughly supports and centers the valve, and by making the outer end of the valve closed a very tight closure is secured, preventing any entrance of air from the back to interfere with the vacuum. The position of the finger $a^{21}$ relative to the arc $a^{22}$ shows instantly to the engineer the position of the water-supply valve, and the operating-handle $a^{20}$ is within easy reach.

By making the outlet of the combining-cone adjacent the flaring shell of the delivery check-valve any wear of the outlet will not tend to throw the water flow to one side, the flaring walls of the shell directing the water flow always toward the center of the check-valve. Such arrangement also greatly facilitates the construction and accurate positioning of the parts in assembling.

By making the leap or space between the mouth of the shell and the outlet of the combining-cone substantially opposite the overflow check-valve the waste water and steam will more readily be freed, as a very direct passage therefor to the waste or overflow outlet is provided.

My invention is not restricted to the precise construction and arrangement of parts herein shown and described, as the same may be modified or varied by those skilled in the art without departing from the spirit and scope of my invention, I having herein shown one practical embodiment of my invention without attempting to illustrate various other forms in which the same could be readily embodied.

Having fully described my invention, what I claim, and desire to secure by Letters Patent, is—

1. In an injector, a casing having an opening at the steam end and provided with a threaded seat for and to fixedly position the steam-cone and a non-threaded seat for the combining-cone, the cones being adapted to be inserted through the said opening of the casing, means to detachably connect the cones, and a detachable closure for the steam end of the casing.

2. In an injector, a one-piece casing having integral seats for the steam and combining cones, one of said seats being threaded to fixedly position the engaged cone, said casing having an opening at the steam end, detachably connected steam and combining cones adapted to be inserted or removed together through said opening in the casing, and a detachable closure for the steam end of the casing.

3. In an injector, a one-piece casing having a threaded and a non-threaded seat, integral therewith, said casing having an opening at the steam end, the steam and combining cones, the former having a threaded portion to engage and be rigidly held by its seat and the latter having a shoulder to butt against the end of the non-threaded seat, means to maintain the combining-cone in position by the steam-cone, said cones being adapted to be inserted and removed through said opening in the casing, and a closure for said opening.

4. In an injector, the casing having an internal heating-chamber, the combining-cone the base of which extends into said chamber, the water-valve, and a deflector to direct the water admitted by the valve to the forward part of the chamber before it enters the cone.

5. In an injector, the casing having an internal, threaded seat and an annular beveled opening at one end, a steam-cone screwed into said seat and having a rigidly-attached combining-cone, and a removable gland provided with a beveled flange to enter and tightly close said beveled opening of the casing.

6. In an injector, the casing having a water-inlet, the rotatable water-valve having an end outlet, and an elongated cylindrical seat therefor.

7. In an injector, the casing having a water-inlet, an elongated, cylindrical valve-seat, and a tubular water-valve closed at its rear end and open at its opposite end, and having a side opening adapted to register with the inlet.

8. In an injector, the casing having an internal heating-chamber, and a water-inlet, an elongated, cylindrical valve-seat at the rear end of the chamber, and a tubular water-valve movable in said seat and closed at its rear end and open at its opposite end, and having a side opening adapted to register with the inlet.

9. In an injector, the casing having a water-inlet, a rotatable, tubular water-valve closed at its rear end and having a side opening adapted to register with the inlet, the valve-stem, and a gland or sleeve through which it passes.

10. In an injector, the casing having a cylindrical chamber provided with a water-inlet, an elongated, tubular water-valve closed at its rear end and rotatably mounted in the chamber, said valve having a lateral opening to register with the inlet, and means to operate the valve.

11. In in injector, a tubular water-valve closed at one end and having a lateral inlet-opening, and an elongated, cylindrical seat forming a continuous support for the valve.

12. In an injector, the casing having a cylindrical chamber open at one end to receive the valve and provided with a water-inlet, a tubular water-valve closed at its outer end and having a lateral inlet, rotatably mounted in said chamber and supported thereby throughout its length, and a gland to close the open end of the chamber.

13. In an injector, the casing having an internal heating-chamber and a communicating cylindrical chamber or valve-seat open at its outer end and provided with a water-inlet, a tubular water-valve closed at its outer end and having a lateral opening adapted to register with said inlet, a gland to close the open end of the said valve-seat, and means to move the valve to regulate the entrance of water to the heating-chamber.

14. In an injector, a casing made as a single casting having integral seats for the steam and combining cones, a cylindrical chamber or valve-seat forming an integral part of the casing and opening thereinto, and a tubular water-valve located within said chamber or seat, the valve being centered and supported thereby throughout its entire length.

15. In a boiler-feeding injector, the check-valve, and a guard interposed between the said valve and the boiler connection.

16. In a boiler-feeding injector, the casing, a check-valve at its delivery end, and a tail-piece connected with the casing beyond said valve and provided with a guard.

17. A tubular tailpiece for boiler-feeding injectors, having an internal guard, for the purpose set forth.

18. The combination, with the casing having the water-inlet, of a water-supply valve having a lateral inlet and longitudinal delivery-passage therein, opening at its forward end, and means to actuate the valve to regulate the passage of water therethrough from the water-inlet.

19. In an injector, an overflow-valve, a spring-actuated seating device to maintain said valve seated when using the injector as a heater, and a detent to normally retain said device inoperative.

20. In an injector, an overflow-valve, an inclosing chamber, a spring-actuated plunger therein to engage said valve and maintain it seated, and means to normally maintain the plunger out of engagement with the valve.

21. In an injector, an overflow-valve, an inclosing chamber, a sliding plunger therein, and its attached stem extended through the chamber, a spring to force the plunger against the valve and maintain it seated, and external means coöperating with the stem to normally maintain the plunger retracted against the stress of the spring and out of engagement with the valve.

22. In an injector, an overflow-valve, an inclosing chamber, a spring-actuated device mounted therein, to engage and maintain the valve seated, said device including a stem projecting through the chamber and having a lateral lug, and a notched ear on the exterior of the chamber, to normally engage the lug and maintain the said spring-actuated device inoperative.

23. In an injector, an overflow-valve, an inclosing chamber, a sliding, spring-actuated plunger therein adapted to engage and maintain the valve seated when using the injector for heating, a projecting stem secured to the plunger and provided with external lateral lugs, and oppositely-located ears on the end of the chamber, notched to normally receive the lugs and hold the stem retracted, disengagement of said lugs and ears by partial rotation of the stem releasing the plunger.

24. In an injector, the combining-cone, the delivery check-valve, an elongated, flaring supporting-shell therefor having its mouth of greater area than the outlet of said cone and adjacent thereto, and the overflow check-valve located substantially opposite the rear end of said shell.

25. In a boiler-feeding injector, the check-valve, and means located beyond the latter to prevent the passage of any broken or detached part of the injector to the boiler connection.

In testimony whereof I have signed my name to this specification in the presence of two subscribing witnesses.

NATHANIEL B. DODGE.

Witnesses:
JOHN C. EDWARDS,
AUGUSTA E. DEAN.